(12) United States Patent
Noe et al.

(10) Patent No.: US 6,340,536 B1
(45) Date of Patent: Jan. 22, 2002

(54) ZIRCONIUM AND NIOBIUM ALLOY COMPRISING ERBIUM, PREPARATION METHOD AND COMPONENT CONTAINING SAID ALLOY

(75) Inventors: Maxy Noe, Mirabeau; Pierre Beslu, Aix en Proveres; Jean-Christophe Brachet; Philippe Parmentier, both of Villebon-sur-Yvette; Jacques Porta, Rians, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/646,874
(22) PCT Filed: Feb. 4, 2000
(86) PCT No.: PCT/FR00/00267
    § 371 Date: Oct. 5, 2000
    § 102(e) Date: Oct. 5, 2000
(87) PCT Pub. No.: WO00/46414
    PCT Pub. Date: Aug. 10, 2000

(30) Foreign Application Priority Data
Feb. 5, 1999 (FR) .............................................. 99/01370

(51) Int. Cl.⁷ ......................... B32B 15/01; C22C 16/00
(52) U.S. Cl. ........................ 428/660; 75/621; 148/538; 148/672; 148/407; 148/421; 376/339; 376/416; 376/419; 376/447; 376/457; 420/422; 428/615; 428/636

(58) Field of Search ................................. 428/660, 636, 428/615; 420/422; 75/621; 148/538, 672, 407, 421; 376/339, 416, 419, 447, 457

(56) References Cited

U.S. PATENT DOCUMENTS

| 4,671,826 A | * | 6/1987 | Prizzi ........................... 148/672 |
| 5,241,571 A | * | 8/1993 | Pati et al. ..................... 420/422 |
| 5,254,308 A | * | 10/1993 | Garde et al. ................. 420/422 |
| 5,267,284 A | * | 11/1993 | Grossman .................... 420/422 |
| 5,267,290 A | * | 11/1993 | Corsetti et al. ............. 376/419 |

FOREIGN PATENT DOCUMENTS

| EP | 0195155 A1 | * | 9/1986 | ............. G21C/3/06 |
| EP | 0415134 A1 | * | 3/1991 | ............ C22C/16/00 |
| EP | 0532830 A1 | * | 3/1993 | ............ C22C/16/00 |
| EP | 0559096 A1 | * | 9/1993 | ............. C22F/1/18 |

* cited by examiner

Primary Examiner—Robert R. Koehler
(74) Attorney, Agent, or Firm—Oblon, Spivak, McClelland, Maier & Neustadt, P.C.

(57) ABSTRACT

An alloy of zirconium and niobium that includes erbium as a consumable neutron poison, its method of preparation and a component comprising said alloy are provided. This invention relates to an alloy of zirconium and niobium that includes erbium as a consumable neutron poison. The invention also relates to a method for the preparation and conversion of said alloy and a component comprising said alloy. Such an alloy is particularly intended for the manufacture of cladding and/or other elements or structural components of fuel assemblies for nuclear reactors using water as coolant.

34 Claims, 5 Drawing Sheets

Figure 1:
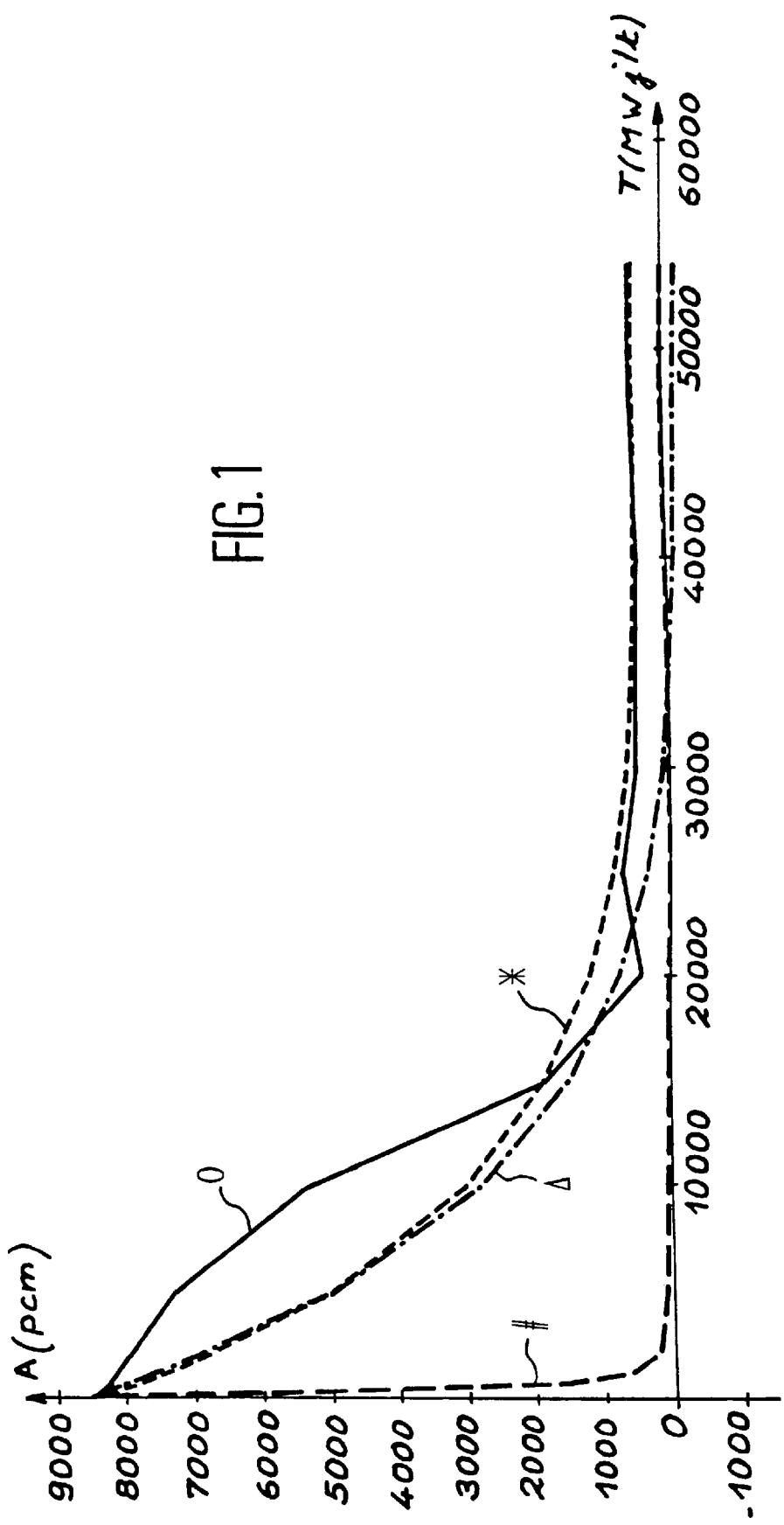

ZIRCONIUM AND NIOBIUM ALLOY COMPRISING ERBIUM, PREPARATION METHOD AND COMPONENT CONTAINING SAID ALLOY

This invention relates to an alloy of zirconium and niobium that includes erbium as a consumable neutron poison.

The invention also relates to a method for the preparation and conversion of said alloy and a component comprising said alloy.

Such an alloy is particularly intended for the manufacture of cladding and/or other elements or structural components of fuel assemblies for nuclear reactors using water as coolant, that is to say, reactors in the French network of the pressurized water (PWR) type. This alloy could also be used in any type of reactor under development or in the future.

In particular, in order to reduce the price of producing electricity, it is of interest to prolong the operating cycle of nuclear pressurized water reactors (PWRs). In effect, an operating cycle which changes from 12 months to 18 months enables an economy to be made of one shut down per three year period which has repercussions, which are far from being negligible, on the overall economic results of the installation.

The prolonging of the duration of a cycle, otherwise referred to as long cycle operation, nevertheless requires the fuel to have a reserve of additional reactivity, that is to say, an increase in the initial fuel enrichment which changes, for example, from about 3.7% to about 4.2% when a third of the core is used for management.

This increase in the reactivity of the fuel must be compensated for by an excess of anti-reactivity at the start of the cycle, that is to say, by an increased reactivity control requirement.

According to current practice in PWRs, the anti-reactivity is provided by soluble boron dissolved at variable concentration, in the coolant of the primary circuit.

The capture of surplus neutrons is provided by the reaction $^{10}B(n, \alpha)^7Li$ so as to maintain a multiplication factor of one during the course of a cycle, which enables the divergence of the fission reaction to be controlled.

However, the increase in the initial soluble boron content in the primary circuit, which is already carried out in practice, has numerous disadvantages, certain of which have an impact on the safety of the installation.

Hence, it is essential that the quantity of dissolved boron be maintained at less than a maximum limit in order to respect the criterion of having a negative coefficient of reactivity for the moderator ($\alpha_m < 0$) under all conditions of operation of the reactor including cold shutdown.

The risk that the moderator coefficient could possibly become positive is not to be dismissed since the soluble boron, like other poisons dissolved in the coolant, is liable to expand when there is an increase in temperature thereby inducing a positive contribution to the $\alpha_m$ coefficient.

In addition, the introduction of extra quantities of boron in the form of boric acid $H_3BO_3$ increases, on the one hand the problems of direct corrosion (of austenitic alloys) and on the other hand of indirect corrosion associated with the concentration of lithia (zirconium based alloys).

In effect, the increase in the quantity of boron in the form of $H_3BO_3$ implies an increase in the quantity of pH control agent, generally $^7LiOH$, so as to limit the activation of the circuits resulting from the release of components of the austenitic materials by the activation products, such as $^{58}Co$, $^{60}Co$, $^{54}Mn$, $^{59}Fe$, $^{51}Cr$ etc.

The conditioning lithium and still more the recoil atoms of $^7Li$ arising from the neutron captures of the $^{10}B$ cause acceleration of the corrosion of the cladding.

Furthermore, large deposits on the core could restrict the operating conditions and the availability of the installation.

This phenomenon called axial offset is found today in units, above all in the USA, which have a tendency to function with a coolant chemistry that has too low a pH.

The danger of untimely dilution of the boron is on the other hand one of the main initiators of a reactivity accident (RIA).

Such an accident is particularly feared during reloading of the core with withdrawal of the shim rod banks and in the case of an untimely start-up of a primary pump.

Control by dilution of the boron leads to large production of contaminated effluents as well as considerable running restrictions; the speed of dilution being additionally limited by the dimensioning of the installation.

Finally, it is apparent that the soluble boron is generally insufficient to control cores made up of a fuel formed with 100% MOX, given the leakage hardening of the neutron spectrum. This would also be the case for under-moderated reactors which might be considered for the incineration of waste.

Consumable poisons other than soluble boron or used in conjunction with it have therefore been considered.

These poisons are in solid form and do not therefore expand like water when there is an increase in temperature. Because of this, they do not lead to a positive contribution to the reactivity coefficient of the moderator $\alpha_m$.

Gadolinium associated with the fuel pellet has for a long time been considered the reference solid poison, but its mediocre thermal conductivity leading to the development of hot spots has lead to a consideration of erbium for the same purposes.

Hence it has been proposed to use erbium as a consumable poison in the form of the sesquioxide ($Er_2O_3$) dispersed in a homogeneous way in certain fuel rods.

Such an arrangement displaces fissile material from the fuel rods and reduces the overall proportion of fissile material that is effectively available to produce energy.

An additional disadvantage to introducing the consumable poison into the fuel is contamination of the production lines.

It has also been suggested that binary alloys of zirconium and erbium be used with from 10 to 90% by weight of erbium as well as Zircaloy®-2 with 0.5 to 2% by weight of erbium as a material going into the composition of the control rods.

However, such alloys have poor resistance to corrosion which makes them unsuitable for use in pressurized water reactors (PwRs).

Particularly in order to remedy these disadvantages, documents U.S. Pat. Nos. 5,241,571 and 5,267,284 propose the introduction of erbium in proportions, in percent by mass, respectively of from 0.05 to 2% and from 0.1 to 0.4% into a zirconium base alloy whose composition specifications are derived from those of Zircaloy®-4 and/or Zircaloy®-2.

In particular, document U.S. Pat. No. 5,241,571 describes an alloy of zirconium, derived from Zircaloy®-4, which contains erbium or gadolinium as consumable poisons, the erbium content being preferably from 0.05% to 2% by weight. This alloy also contains preferably up to 1.4% tin, from 0.2 to 0.5% of iron, and from 0.07 to 0.25% of chromium.

Niobium can also be added in a quantity ranging up to 0.6% by weight, similarly vanadium in a quantity ranging up to 0.5% by weight. The role of the niobium is to increase the mechanical strength and the resistance to corrosion of the alloy.

A preferred range for the niobium content is from 0.1% to 0.3% and Table 1 of this patent indicates specifically a niobium content that is imperatively less than or equal to 0.6% by weight, which corresponds approximately to the solubility limit commonly accepted for niobium in solid solution at 500–600° C. in the α phase (hcp structure) of the zirconium.

Finally, silicon and oxygen may also be present at respective contents of from 50 to 120 ppm and from 1000 to 2000 ppm.

The alloys described in these documents, and particularly in the document U.S. Pat. No. 5,241,571 have numerous disadvantages, defects and limitations. In particular, this document at no time describes the industrial feasibility of the alloys described and no example of use is given, so that the possibility of obtaining, from the alloys in this document, cladding corresponding to the specifications considered, is unreliable. The same comments are applicable to the alloys from patent U.S. Pat. No. 5,267,284.

In effect, it is well known to a man skilled in the art in this field of technology that the incorporation of rare earths, such as erbium, into alloys of the Zircaloy® type gives a final alloy having no homogeneity whatsoever and which is therefore difficult, if not impossible, to manufacture and which, in all cases cannot be efficiently put to use.

In particular, such alloys have no capability for mechanical or thermo-mechanical processing such as rolling and can therefore never be put into a form suitable for there chief use, that is to say in cladding materials.

In addition, if an increase in the duration of the operating cycle and also an increase in the percentage combustion when unloaded are being aimed at, such alloys have properties which are still not satisfactory, particularly under irradiation. Regarding resistance to corrosion, that is to say oxidation—hydride formation—exfoliation, and the mechanical strength represented by the deformation and plastic creep properties, it is in effect acknowledged that the zircaloys (the specifications of which inspired the U.S. patents) have reached their limits in terms of service life, for present day conditions of operation of French PWRs in particular.

It emerges from what has gone before that there still exists a need, as yet unsatisfied, for an alloy of zirconium that includes erbium as a consumable neutron poison which has, in particular excellent corrosion resistance properties and excellent mechanical properties superior to those of existing alloys, particularly under irradiation by a neutron flux.

In addition, there exists a need for a zirconium alloy that includes erbium which can be efficiently manufactured, without difficulty and which has the capability of being subjected to mechanical and thermo-mechanical processing such as rolling for the purpose of forming it for the applications for which it is intended, such as cladding in nuclear reactors.

Finally, this alloy must, of course, possess all the using properties normally required in the context particularly of such use: namely, as has already been mentioned, mechanical strength, resistance to corrosion in service and the possibility of supporting high fuel reactivity.

The objective of the invention is therefore to provide an alloy of zirconium, that includes erbium as a consumable neutron poison which does not have the disadvantages, defects and limitations of the alloys of the prior art, which overcomes the problems of the alloys of the prior art and which fulfils, among other things, the series of needs mentioned above.

This objective, and others, have been achieved, conforming to the invention, by an alloy of zirconium, that includes erbium as a consumable neutron poison, this alloy being characterized in that it comprises by weight:

more than 0.6% of niobium;
from 0.1 to 3.0% of erbium;
from 0.05 to 0.5% of oxygen;
from 50 ppm to 0.6% of iron;
up to 3.5% of tin;
manufacturing impurities;
and the remainder zirconium.

The alloy above is characterized in particular by a defined niobium content, that is to say greater than 0.6%, preferably this content is from 0.7 to 3% by weight, and more preferably from 0.80 to 1.20% by weight.

Such a range of niobium content is neither described nor suggested in the prior art and particularly in the document U.S. Pat. No. 5,241,571 where the niobium content does not exceed 0.6% by weight.

It is the same, a fortiori, for the preferred ranges mentioned above.

Another essential and totally unexpected characteristic of the alloy according to the invention is that there is no discernable segregation of the erbium in the alloy in the form of precipitates or at the interfaces of the matrix.

In other words, the erbium is distributed in a homogeneous manner in the alloy. This remarkably homogeneous distribution of the erbium in the alloy is noted in the alloy in the raw, as melted/solidified, state.

The alloy, according to the invention, will therefore run counter to and overcome a prejudice commonly held in the field of the preparation of zirconium base alloys which expects that incorporation of, in particular, a rare earth such as erbium into these zirconium base alloys gives a final alloy that does not possess any homogeneity and is difficult if not impossible to fabricate.

The alloy according to the invention, contrary to the alloys from the US patents mentioned above, is completely homogeneous, in particular with regard to the distribution of the erbium and its ease of fabrication has been proven and demonstrated by the inventors, in particular in the examples given below.

Furthermore, the alloy described in this way and called the "as melted" alloy, according to the invention, in contrast to the alloys of the prior art, may, without problem, be subjected to various thermal conversion processes and/or thermal and/or hot and cold mechanical forming processes, such as homogenization processes and cold rolling.

According to a first preferred embodiment of the invention, all or part of the erbium is found in the alloy in the form of complex oxide precipitates, mainly containing erbium, the mean size of which is preferably less than or equal to one micrometer.

These precipitates are, preferably, distributed in a uniform and homogeneous manner in the alloy. By influencing the size and/or the distribution of these oxides of erbium, the hot mechanical properties can be optimized and improved.

Such an alloy is called an Oxide Dispersion Strengthened (ODS) alloy.

In addition, in a second preferred embodiment, evidence has been provided that the alloy according to the invention, the niobium content of which is greater than 0.6% by weight, has a specific and original microstructure relative to the niobium for which no evidence has been given and which has not been mentioned, in the alloys of the prior art.

The alloy according to the invention, in effect, is characterized by a microstructure in which the main phase is constituted by a matrix of zirconium-α and the secondary phase is mainly constituted by individual precipitated microcrystalline particles of niobium-β, which are preferably distributed in a homogeneous and uniform manner within said zirconium-α matrix in addition to the possible precipitates of erbium in the form of the complex oxides mentioned above.

Preferably, said particles of niobium-β have a specific mean size, and preferably this mean size is from 10 to 100 nm, for example, 50 nm.

Such a microstructure only exists for the niobium contents indicated above, greater than 0.6%.

In other words, the alloy according to the invention is characterized by a minimum content of niobium, greater than 0.6% by weight, which exceeds the solubility at 500–600° C. commonly accepted for niobium in solid solution in the α phase of zirconium (hcp structure).

A fraction of the element niobium is therefore to be found dispersed within the main matrix of α-zirconium (α-Zr) in the form of intermetallic precipitates of β-niobium (β-Nb).

This particular configuration, specific to the alloy according to the invention contributes fundamentally to the excellent properties of the alloy, and in particular to the good behavior of the alloy in service.

There is nothing that leaves a man skilled in the art to suppose, from the disclosures in the document U.S. Pat. No. 5,241,571, that by placing the niobium contents within this specific range, the essentially two phase structure (disregarding possible erbium oxides) that is obtained would offer improved corrosion and deformation properties within this defined range.

In effect, in said document U.S. Pat. No. 5,241,571 and for niobium contents in the alloy ranging up to 0.6%, an alloy is produced that may be considered to be essentially single phase at least insofar as the two elements zirconium and niobium are concerned, the latter being dissolved in the zirconium-α matrix.

Hence, in this document, one sought to obtain a single phase alloy and a man skilled in the art is positively dissuaded, by the disclosures in this document from obtaining precipitation of the niobium, so that nothing would leave one to suppose that it would provide any improvement whatsoever in the properties of the alloy. Indeed the contrary is the case.

However, it is precisely the precipitation of niobium-β obtained within the specific range of contents according to the invention, this precipitate additionally being produced in a form and in a very precise manner which appears, in an unexpected way, to provide for the alloy according to the invention a large part of its excellent properties which are superior in every case to those of the analogous alloys of the prior art, used for example in nuclear reactors, or known from the document U.S. Pat. No. 5,241,571.

The excellent properties of the alloys according to the invention relate particularly to the corrosion resistance, for example resistance to oxidation and to hydride formation, as well as to its mechanical strength properties relating to its deformation and to its plastic creep.

The alloy according to the invention therefore responds to all of the requirements and criteria mentioned above.

In an unexpected way, this performance is not much affected by irradiation, notably by a neutron flux, in contrast to the alloys derived from Zircaloy-4® for which the corrosion kinetics under irradiation can be accelerated by a factor of 3 or more.

The alloy according to the invention, because of its properties, is therefore particularly suitable for the main purpose for which it is intended, namely the manufacture of cladding and other structural elements for fuel assemblies for nuclear reactors, in particular reactors of the PWR type.

The alloy according to the invention allows one to avoid increasing the quantity of soluble boron used and to avoid all the disadvantages that stem from this.

Another subject of the invention is a component comprising the alloy according to the invention.

Such a component is preferably a fuel cladding and/or a structural element of a fuel assembly for a nuclear reactor (support grid, tube guide etc.) of the pressurized water (PWR) type, or any other innovative reactor design using water (or heavy water) as heat transfer medium.

The component comprising the alloy according to the invention is, preferably, a component with a multiplex structure, comprising the alloy according to the invention and at least one other material.

Preferably, said component is a component with a so-called duplex structure or a component with a so-called triplex structure.

The component with a duplex structure is, for example, in the form of a tube or co-laminated sheet comprising a first layer, or internal layer, constituted by the alloy according to the invention, and a second layer or external layer placed on said first layer and constituted by another metal or alloy different from the alloy according to the invention that constitutes the first layer.

Preferably, said second layer or external layer is also constituted by a zirconium alloy, for example, an alloy of zirconium that has optimum properties with respect to the corrosion, for example the external corrosion of the tube or the sheet metal in a nuclear environment. This zirconium alloy forming the second layer is more preferably a zirconium alloy having the same composition as the alloy of the invention but without the erbium and with an oxygen content that is possibly different.

In the case of a component with a triplex structure, the component additionally comprises a third layer, "more internal" placed under said first layer and also constituted by another metal or alloy different from that of the invention and, preferably, identical to the metal or alloy constituting said second layer. That is to say that it is preferably a zirconium alloy analogous to that of the invention but without any erbium and with an oxygen content that is possibly different.

The invention also relates to a method of preparation and possibly of conversion of the alloy described above, said method comprising the melting of the elements of the alloy as they have been described above and in the proportions mentioned; and possibly:

a succession of heat treatments and hot and/or cold forming steps;

a final heat treatment.

The final heat treatment is preferably carried out at a temperature less than or equal to 600° C., and for a period of time greater than 1 or several minutes, for example, 5 hours.

The temperature is, for example, 580° C. and the duration is, for example, from 5 to 10 hours.

More precisely, the invention also concerns a method of preparation and possibly of conversion of the alloy described above, said method comprising: the melting of the elements of the alloy, as they have been described above and in the proportions mentioned; and possibly the succession of the following steps:

a homogenization heat treatment;

hot trimming a recrystallization heat treatment cold rolling a recrystallization heat treatment cold rolling.

Preferably the recrystallization heat treatments, in particular, the final treatment, are carried out at a temperature less than or equal to 600° C. and their duration is preferably greater than 1 or several minutes, for example, 5 hours, that is to say, that one is then in the single phase α-zirconium region and that a homogeneous distribution of the niobium-β particles is thereby obtained in the alloy, the particles having a defined and fine size, preferably of the order of 50 μm.

The temperature is, for example, 580° C. and the duration of the treatment is, for example, from 5 to 10 hours.

Preferably, the melting is carried out by melting a starting alloy of zirconium, comprising all the constitutive elements of the alloy with the exception of the erbium, in the proportions mentioned and then adding to the liquid phase obtained, the required quantity of erbium so that the erbium dissolves in said starting alloy.

The required quantity of erbium may be added in metallic form.

Another possibility consists of adding the required quantity of erbium in an alloyed form, for example, in the form of oxides of the $E_2O_3$ type.

The invention will now be describe in greater detail making reference to the attached drawings in which:

FIG. 1 represents the change in anti-reactivity A (expressed in pcm) as a function of the rate of combustion expressed in mwj/t through poisoning of the cladding for respectively 12 rods at 8% (solid line: ○)

an enrichment at 2% of the cladding with natural erbium (dotted line: *)

an enrichment at 0.5% of the cladding with erbium 167 (mixed dots and dashes: Δ)

an enrichment at 0.056% of the cladding with natural gadolinium (dashed line: #).

Figure 2A:
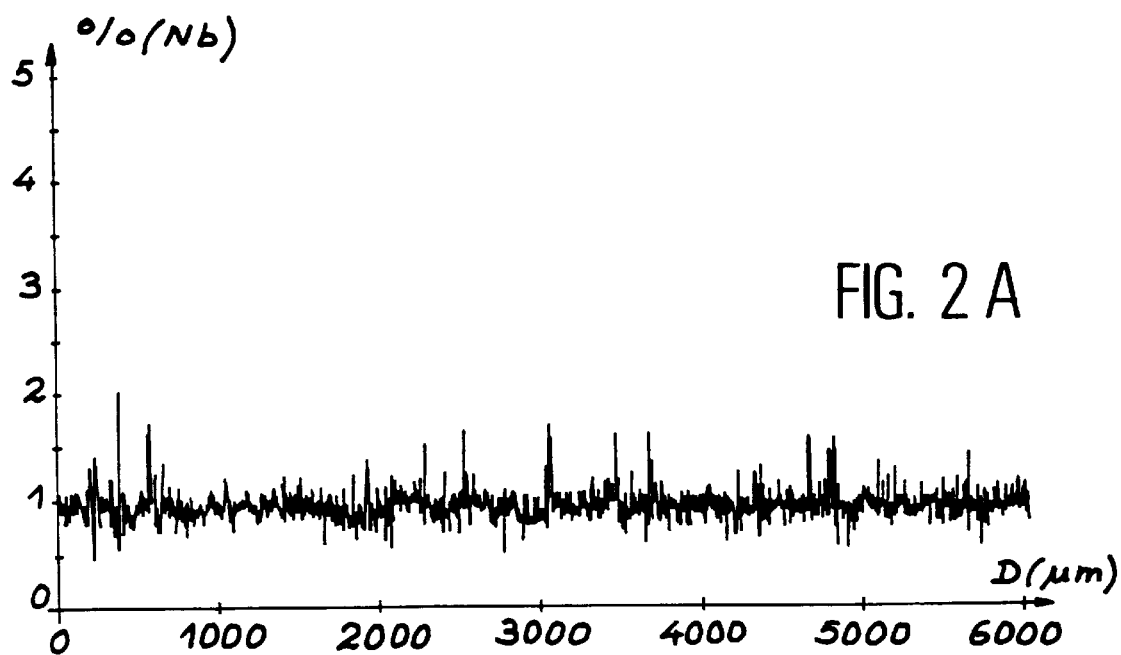
Figure 2B:
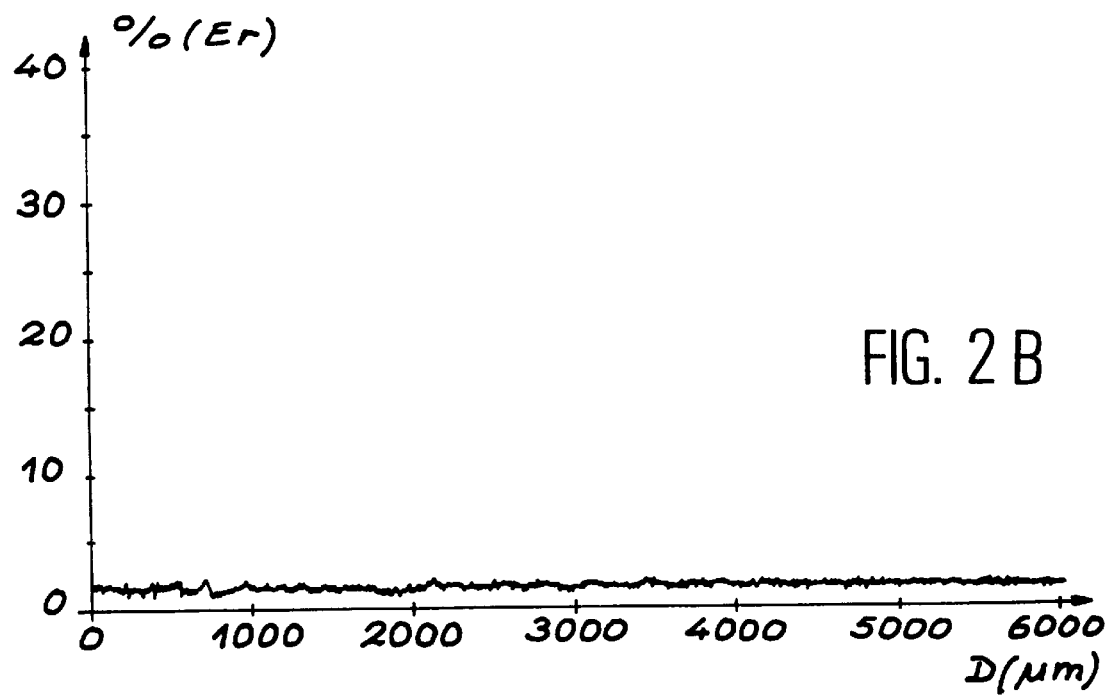

FIGS. 2A and 2B represent the concentration profiles, obtained by X-ray microanalysis by wavelength scattering, obtained at the electronic micro-probe on a massive polished sample of an alloy Zr—1%Nb—1.6%Er—1200 ppm $O_2$ in the raw solidified state.

FIG. 2A gives the percentage by weight of niobium as a function of the analysis distance D expressed in pm while FIG. 2B gives the percentage by weight of erbium as a function of D expressed in μm.

FIG. 3 represents the concentration profiles obtained by X-ray micro-analysis by energy dispersal obtained in transmission electron microscopy with a field emission gun (FEG-STEM) on a thin sheet made of a Zr—1%Nb—1.6%Er—1200 ppm $O_2$ alloy in the raw solidified state.

Figure 3A:
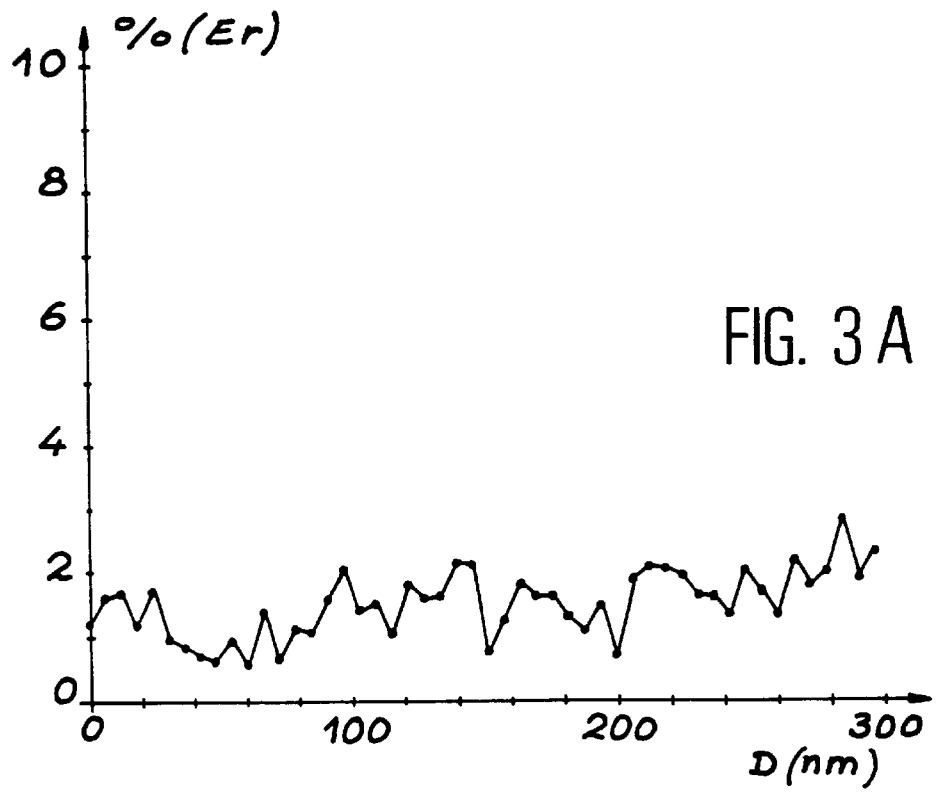

FIG. 3A gives the % by weight of Er as a function of the analysis distance D expressed in nm.

Figure 3B:
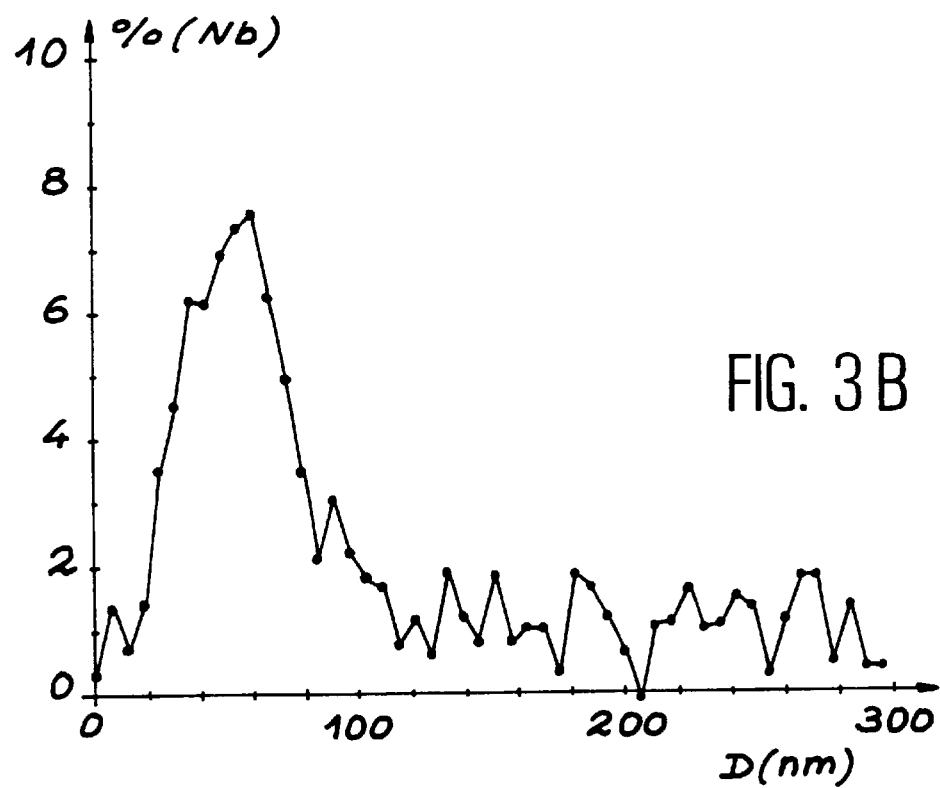

FIG. 3B gives the % by weight of Nb as a function of the analysis distance D expressed in nm.

Figure 4A:
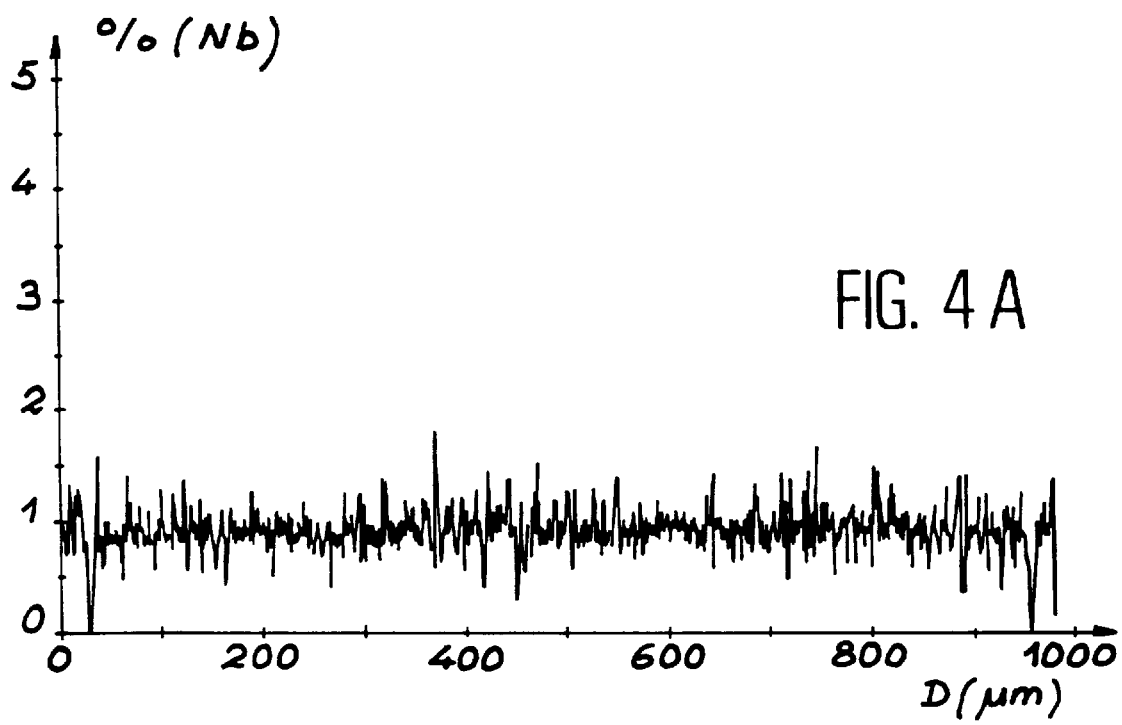
Figure 4B:
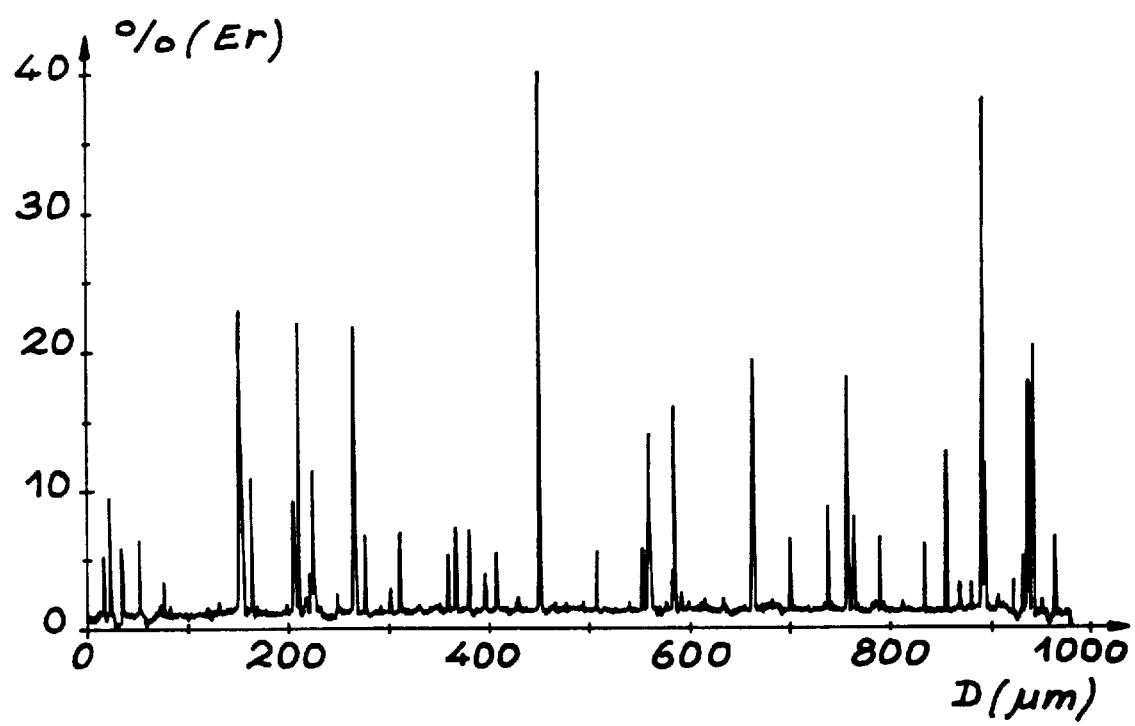

FIGS. 4A and 4B represent the concentration profiles, obtained by X-ray microanalysis by wavelength scattering, obtained at the electronic micro-probe on a massive polished sample of an alloy Zr—1%Nb—1.6%Er—1200 ppm $O_2$ after having been heat treated for 30 minutes at 1100° C. during an homogenization operation.

FIG. 4A gives the % by weight of Nb as a function of D (μm) and FIG. 4B gives the % by weight of Er as a function of D (μm).

Figure 5A:
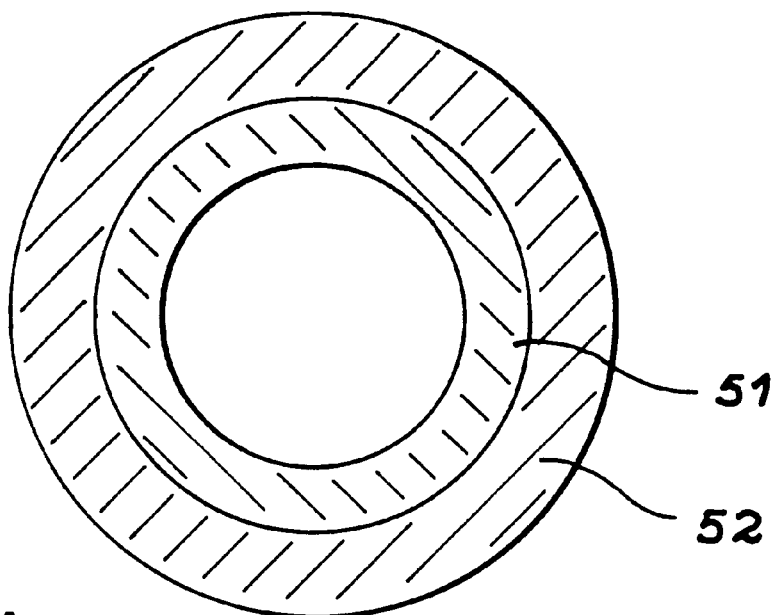
Figure 5B:
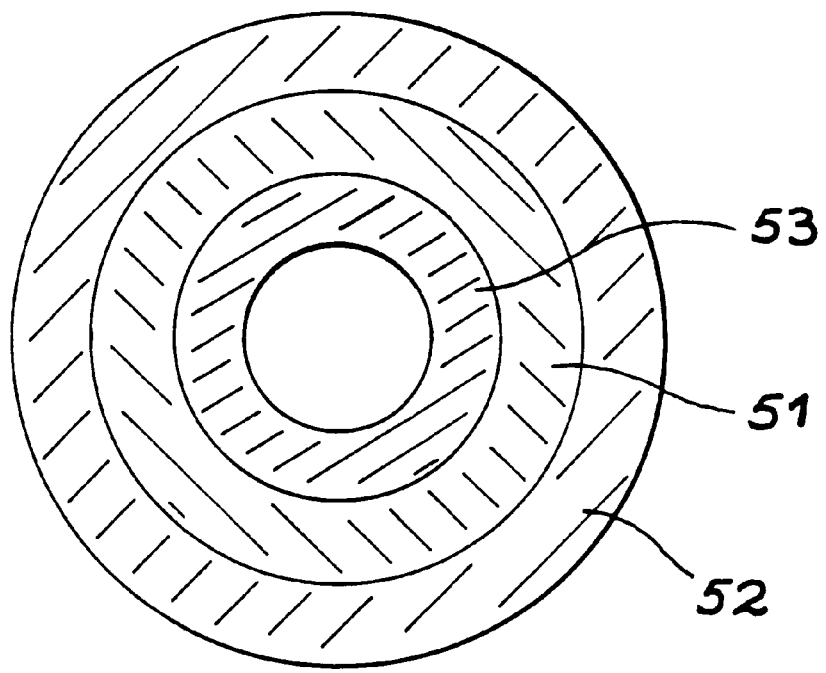

FIGS. 5A and 5B are diagrammatic views in cross section of tubes comprising the alloy of the invention and having respectively duplex (FIG. 5A) and triplex structures (FIG. 5B).

To put it more clearly, the alloy according to the invention includes from 0.1 to 3% by weight of erbium which plays the role of a consumable neutron poison.

The erbium may be natural erbium, that is to say erbium which contains the isotopes of erbium in the proportions which are found naturally in nature but it may also be erbium enriched in $^{167}$Er, or indeed any combination of isotopically enriched erbium and natural erbium.

The type of erbium used as well as the proportions of the various types of erbium in the mixture that may be used may easily be determined by a man skilled in the art in this field of technology, in relation, in particular, to the desired application.

The content of erbium in the alloy is generally situated within the range indicated above of from 0.1 to 3% by weight, and preferably from 0.5 to 2% by weight.

The erbium content may easily be determined by a man skilled in the art and is also a function of the isotopic composition of the erbium used.

The incorporation of erbium into the alloy according to the invention enables it to be given a certain number of properties inherent in the use of erbium as a consumable poison.

Hence $^{167}$Er has a low residual value expressed in barns (b) for the effective absorption cross section ($\sigma_a$) during the radioactive capture reaction $^{167}$Er (n,γ), $^{168}$Er (σ=1.9b for 168Er).

In contrast to this, the value σ=670b for $^{167}$Er permits a reasonable life for this absorber in relation to the irradiation cycle, in comparison with gadolinium the respective values for which are σ=610000b for $^{155}$Gd and σ=254000b for $^{157}$Gd.

The absorbent isotopes of gadolinium would disappear much more rapidly during the irradiation cycle. On the other hand, as for this last case, the reaction product $^{168}$Er from the erbium is not radioactive and therefore does not generate an additional quantity of waste in the event of warehousing of shells and end pieces on surface sites.

Another particular characteristic of erbium is the capture reaction (n,γ) which avoids the accumulation of lattice defects since the energy of the γ photon is less than the lattice energy, and on the other hand, this type of nuclear reaction prevents the appearance of foreign chemical species, particularly helium.

Preliminary calculations of the production of anti-reactivity by poisoning of the cladding, according to different hypotheses are represented by way of an example, in FIG. 1.

In addition, erbium, like other elements in the lanthanide group, introduced in the quantities indicated above, can contribute in a positive way to the increase in the mechanical strength: using an optimized manufacturing route sheet, one may envisage obtaining an erbium Oxide Dispersion Strengthened (ODS) alloy which would then also find possible applications which are non-nuclear but are applications at temperatures for which an improvement in the hot mechanical properties (creep properties) is necessary.

In addition, with erbium oxides possibly present in the first embodiment of the invention, the specific microstructure according to the invention, with the precipitates of niobium-β of a specific structure forming the secondary phase is only obtained for contents by weight of Nb greater than 0.6%.

In effect, for lower niobium contents, one no longer has or almost no longer has any niobium-β precipitates.

Similarly, for niobium contents that are too high, the operational properties could possibly be degraded. It is therefore preferable for the niobium content to be within the preferred ranges mentioned above.

By individual precipitated particles of niobium-β one generally understands that these particles have a mean size (generally defined by their diameter) of the order of 10 to 100 nm, preferably of the order of 50 nm.

Taking into account the fact that, in the alloy, the erbium can be found precipitated in the form of complex oxides, the quantity of oxygen corresponding to the formation of this oxide must be added to the metal so as to maintain its mechanical properties.

Because of this, as mentioned above, the alloy according to the invention therefore also contains oxygen at a content of from 0.05 to 0.5% by weight. Preferably, the oxygen content is from 0.1 to 0.35% by weight.

It should be noted that an oxygen content greater than the usual industrial contents which are 1200 ppm, can be used to compensate for the loss of this element in solid solution because of the precipitation of all or a part of the erbium in the form of oxides during the heat treatments during manufacture.

The alloy according to the invention further contains iron at a content of from 50 ppm to 0.6% by weight. Preferably the iron content is from 150 to 350 ppm. The alloy according to the invention possibly contains tin at a content that may range up to 3.5% by weight, that is to say this tin content is from 0 to 3.5% by weight. Preferably the tin content is from 0 to 1.2%.

The tin is found in solid solution in the main phase of zirconium-α.

The alloy according to the invention additionally contains a certain number of manufacturing impurities.

The nature and the levels of these impurities are generally the natures and the levels typical of the impurities in the industrial zirconium based alloys used, in particular, in the nuclear industry and which are therefore compatible, in particular, with the requirements of the specifications in this industry. The main examples of these impurities and their respective levels are generally as follows:

silicon: from 10 to 120 ppm
chlorine: from 0 to 20 ppm
sulfur: from 10 to 100 ppm
phosphorus: from 2 to 10 ppm
boron: from 0.1 to 10 ppm
calcium: from 0.1 to 10 ppm
lithium, fluorine, heavy metals: less than 0.1 ppm (for each element).

It is clear that these manufacturing impurities are only given for the purposes of illustration and that certain of these impurities may be absent, and similarly, other impurities not mentioned above might equally well be present.

Similarly, the contents mentioned above are only given for information purposes, although the range of levels are preferably to be kept to since beyond these values, the properties of the alloy according to the invention could possibly be degraded.

The alloy, being based on zirconium, apart from the elements already indicated above, obviously contains zirconium, the quantity of zirconium present representing the "remainder" of the alloy, that is to say the quantity necessary to reach 100% by weight.

Another subject of the invention is a component comprising the alloy according to the invention.

This component may be any component in which the excellent properties of the alloy according to the invention can be of benefit. By way of example, one may mention uses at relatively higher temperatures or uses where the stress levels are greater than those appropriate for the traditional alloys.

It is obvious, however, that due to incorporation of a consumable neutron poison such as erbium in the alloy according to the invention and because, in addition, the properties of the alloy are preserved under a neutron flux, the alloy according to the invention is more particularly suitable for components used in a nuclear environment and in particular in the nuclear industry.

Therefore the component comprising the alloy according to the invention will be, for example, a cladding and/or a structural element in a fuel assembly for a nuclear reactor of the pressurized water type (possibly of a different design to present day PWRs).

The fact that a consumable poison (erbium) is introduced into the cladding material, as is the case with the alloy of the invention, this consumable poison is of the kind, is present in the proportions and has the intrinsic neutron capture properties that are the optimum with regard to controlling the reactivity of the fuel of present day or future pressurized water reactors (PWRs), (and/or for other types of nuclear reactors). This permits, in particular, the following improvements:

avoiding the introduction of the consumable poison into the fuel which would, as a consequence, generate problems such as contamination of the production lines, reduction in the overall proportion of fuel and therefore of the output, for the same occupied volume.

simplifying the management of the chemistry of the primary medium of the PWRs operating through the skewing and particularly the reduction of the concentration of boric acid and lithia in the primary heat transfer liquid (pressurized water).

In addition, this may lead to operating conditions that are less severe for the cladding (corrosion) and an improvement in certain aspects of safety eliminating accidents of the RIA type.

permitting the support of strong fuel reactivity, particularly at the start of its life, for the purpose of increasing the duration of the operating cycles of the PWRs from which there is a cost benefit to the production of electricity of nuclear origin.

In effect, the alloy according to the invention, because of its excellent properties with respect to corrosion and deformation, particularly under a neutron flux, properties which are clearly superior to those of the alloys used at the present time in pressurized water reactors, enables much greater burn-up fractions to be reached than those normally obtained. This is particularly advantageous in the case where long cycles are being implemented.

Advantageously, the alloy according to the invention offers the possibility of using both cladding containing erbium and cladding that does not contain erbium at the same time in a fuel management system that enables one to flatten the radial flux profile. It is thereby possible to obtain a more homogeneous distribution of temperature within the fuel, particularly in relation to loading strategies, which may not be considered with only a neutron poison such as soluble boron, dissolved in the coolant (the distribution of which is obviously homogeneous throughout the core).

In addition, the use of erbium in the metallic materials of the assembly such as cladding and tube-guides, can occur conjointly or in a complementary way to the use of fuel containing gadolinium $UO_2$—$Gd_2O_3$.

In effect, the gadolinium levels in the fuel pellets are limited by the decrease in the melting point, the decrease in the thermal conductivity and by homogeneity problems, since the two oxides $UO_2$ and $Gd_2O_3$ do not crystallize together. This type of disadvantage is less critical for the cladding and a fortiori, for other metal structures because the temperatures are not so high, in operation, as those of the fuel pellets.

The component comprises the alloy of the invention, that is to say that it may be constituted exclusively by the alloy according to the invention or it may also include another material which is generally metallic.

Hence the component may be produced in the form of a so-called multiplex material comprising the alloy according to the invention and at least one other material. Preferably, the component is produced in the form of a duplex or triplex material, for example in the form of a tube or a co-laminated sheet.

In the case of the component with a duplex structure shown in FIG. 5A, the material constituting the core or internal layer 51, in this case, of the tube is constituted by the zirconium alloy which is the subject of this invention and the external part 52 of the tube is constituted by another zirconium alloy having optimum properties in relation to the external corrosion of the tube in a nuclear environment (chemistry of the primary medium, neutron flux and an operating temperature typical, for example, of PWRs), for example a zirconium alloy analogous to that of the layer 51, but without the erbium.

In the case of a component with a triplex structure (FIG. 5B), the tube additionally comprises an "more internal" layer 53 under layer 51. This layer 53 is preferably constituted by the same alloy as that of the layer 52, that is to say, an alloy, according to the invention, but without any erbium.

The invention also relates to a method for the preparation and possibly for the conversion of the alloy described above which comprises the following steps:

the melting of the elements of the alloy as they have been described above and in the proportions mentioned above; and possibly:

a succession of heat treatments and hot and/or cold forming steps;

a final heat treatment, preferably carried out at a temperature less than or equal to 600° C., and for a period of time greater than 1 or a few minutes, for example, 5 hours.

Preferably, the temperature is, for example, about 580° C. and the duration of the treatment is from 5 to 10 hours.

In the final product obtained (sheet), all or a part of the erbium may be found, according to the invention, in the form of precipitates of complex oxides, the mean size of which is generally from 5 nm to 5 $\mu$m, preferably less than or equal to 1 $\mu$m.

These precipitates are preferably distributed in a homogeneous manner.

By adjusting the time and temperature parameters during the various steps of converting the alloy, it is possible to optimize the size of the complex oxides of erbium.

The in situ formation of these oxides can be favorable to the improvement of certain using properties. For example, it may be envisaged that one may obtain from the initial as solidified state, a distribution of complex oxides that is sufficiently fine and homogeneous, by reducing the durations and/or the temperatures of the heat treatment or treatments, in order to improve the hot mechanical properties, for example the plastic creep properties.

In this way, a zirconium based, Oxide Dispersion Strengthened (ODS) alloy can be obtained.

On the other hand, the intermediate and final heat treatments, that is to say the recrystallization treatments can be carried out in the single phase $\alpha$ region, that is to say at a temperature less than or equal to 600° C., in such a way that a fine and homogeneous distribution of the $\beta_{Nb}$ phase precipitate is obtained, of a mean diameter that is typically 50 nm (equilibrium phase) and therefore is an optimum micro-structure with respect to the properties being sought.

It must be noted that such a structure cannot be obtained starting with the compositions described in the US patent previously mentioned, the niobium content being less than or equal to its solubility limit at 500–600° C. ($\approx$0.6% by mass).

As has been seen above, the material of this invention can be used for the cladding of nuclear fuel, particularly in PWRs, but also in any application linked to the use of nuclear energy for which it is necessary to have available an absorbent material acting in a continuously uniform manner during its period of use.

Finally by obtaining a homogeneous dispersion of erbium oxides that is sufficiently fine, using an optimized production route sheet, it becomes possible to obtain a zirconium based, Oxide Dispersion Strengthened (ODS) alloy which may be used, not only for nuclear applications but also for non-nuclear applications at a temperature requiring an improvement in the mechanical hot strength properties such as for example the plastic creep properties.

The invention will now be described making reference to the following examples, which are non-limitative and given for the purposes of illustration.

EXAMPLES

These examples illustrate the preparation of an alloy according to the invention and demonstrate the industrial feasibility of the introduction of erbium into a zirconium based alloy, evidence for which is provided by the manufacture of a rolled sheet from this alloy.

Example 1

This example illustrates the production of an alloy according to the invention. The production phase of the alloy consists firstly of remelting an industrial zirconium based alloy containing 1% by weight of niobium and adding 1.6% of erbium to it in metallic form.

Details of the composition of the alloy obtained are given in Table I below:

TABLE I

| Chemical composition of the alloy produced | | | | | | |
|---|---|---|---|---|---|---|
| Elements | Nb | O | Fe | Erbium | Impurities | Zr |
| % or ppm (mass) | ≈1% | ≈1200 ppm | ≈250 ppm | ≈1.6% | Typical contents for industrial alloys | The complement |

The micro-structure of the "as melted" material obtained, has been studied using various analysis methods.

The chemical distribution analyses are carried out, on the one hand on a micron scale using the technique of X-ray micro-analysis by wavelength scattering and on the other hand on a sub-micron scale by the technique of X-ray micro-analysis by energy dispersion obtained by transmission electron microscopy with a field emission gun (FEG-STEM) on a thin sheet.

FIGS. 2A and 2B represent the concentration profiles obtained by X-ray micro-analysis by wavelength scattering obtained with the electronic micro-probe on a massive polished sample of a Zr—1%Nb—1.6%Er—1200 ppm $O_2$ alloy in the raw solidified state.

FIG. 2A gives the percentage by weight of Nb as a function of the analysis distance D expressed in $\mu$m while FIG. 2B gives the percentage by weight of Er as a function of the analysis distance D expressed in $\mu$m.

FIG. 3 represents the concentration profiles obtained by X-ray micro-analysis by energy dispersal obtained in transmission electron microscopy with a field emission gun (FEG-STEM) on a thin sheet made of a Zr—1%Nb—1.6%Er—1200 ppm $O_2$ alloy in the raw solidified state.

FIG. 3A gives the % by weight of Er as a function of the analysis distance D expressed in nm.

FIG. 3B gives the % by weight of Nb as a function of the analysis distance D expressed in nm.

It may be observed that in these Figures there is no detectable segregation of the erbium in the form of precipitates or at the interfaces of the matrix.

The added erbium is therefore, against all expectation, distributed in a remarkably homogeneous manner at this stage of manufacture, that is to say in the alloy in the raw solidified state, something that the prior patents mentioned above definitely did not enable one to predict.

Example 2

Starting with the alloy produced in Example 1 (the as-melted alloy), a rolled sheet was prepared by carrying out the following successive steps.

Firstly, a homogenization heat treatment was carried out at 1100° C. for 30 minutes under a secondary vacuum with rapid cooling. Then the following conversion route was followed:

Hot trimming: 30% per pass at about 580° C.

A heat treatment for recrystallization into a phases at 580° C. for 2 hours under vacuum Cold rolling with 50% thickness reduction;

Recrystallization heat treatment at 580° C. for from 5 to 10 hours.

It should be noted that the cold convertibility of the material is at least as good as that of the reference industrial alloy (with no erbium addition).

Micro-structural examination of the alloy after the various heat treatments and the forming by rolling, shows that all or part of the erbium is found in the form of complex oxide precipitates the mean size of which is of the micron order.

In the final rolled sheet the precipitates are distributed in a homogenous manner as shown in FIGS. 4A and 4B which show the concentration profiles obtained by X-ray microanalysis by wavelength scattering, obtained at the electronic micro-probe on a massive polished sample of an alloy Zr—1%Nb—1.6%Er—1200 ppm $O_2$ after having been heat treated for 30 minutes at 1100° C. during a homogenization operation.

FIG. 4A gives the % by weight of Nb as a function of D ($\mu$m) and FIG. 4B gives the % by weight of Er as a function of D ($\mu$m).

What is claimed is:

1. A zirconium alloy that includes erbium as a consumable neutron poison, the zirconium alloy comprising by weight:

more than 0.6% of niobium;

from 0.1 to 3.0% of erbium;

from 0.05 to 0.5% of oxygen;

from 50 ppm to 0.6% of iron;

up to 3.5% of tin;

manufacturing impurities; and the remainder zirconium.

2. The zirconium alloy according to claim 1, comprising 0.7 to 3% by weight of niobium.

3. The zirconium alloy according to claim 2, comprising 0.80 to 1.20% by weight of niobium.

4. The zirconium alloy according to claim 1, comprising from 0.5 to 2.0% by weight of erbium.

5. The zirconium alloy according to claim 1, wherein the erbium is selected from the group consisting of natural erbium, erbium isotopically enriched with $^{167}$Er and their mixtures.

6. The zirconium alloy according to claim 1, wherein said manufacturing impurities comprise:

from 10 to 120 ppm of silicon;

from 0 to 20 ppm of chlorine;

from 10 to 100 ppm of sulfur;

from 2 to 10 ppm of phosphorus;

from 0.1 to 10 ppm of boron;

from 0.1 to 10 ppm of calcium; and less than 0.1 ppm for each of lithium, fluorine, and heavy metals.

7. The zirconium alloy according to claim 1, wherein the erbium is distributed in a homogeneous manner in the alloy and in that there is no segregation of the erbium in the form of precipitates.

8. The zirconium alloy according to claim 1, wherein all or part of the erbium is found in the alloy in the form of complex oxide precipitates mainly containing erbium.

9. The zirconium alloy according to claim 8, wherein the mean size of said precipitates is less than or equal to one micrometer.

10. The zirconium alloy according to claim 8, wherein said precipitates are distributed in a uniform homogeneous manner in the alloy.

11. The zirconium alloy according to claim 1, wherein said alloy has a microstructure in which the principal phase is constituted by a matrix of zirconium-α and the secondary phase is mainly constituted by individual precipitated microcrystalline particles of niobium-β.

12. The zirconium alloy according to claim 11, wherein said particles of niobium-β of the secondary phase are distributed in a homogeneous uniform manner in the zirconium-α matrix of the alloy.

13. The zirconium alloy according to claim 12, wherein said particles of niobium-β of the secondary phase have a mean size of from 10 to 100 nm.

14. The zirconium alloy according to claim 13, wherein said particles of niobium-β of the secondary phase have a mean size of 50 nm.

15. A component comprising a zirconium alloy that includes by weight:

more than 0.6% of niobium;

from 0.1 to 3.0% of erbium;

from 0.05 to 0.5% of oxygen;

from 50 ppm to 0.6% of iron;

up to 3.5% of tin;

manufacturing impurities; and the remainder zirconium.

16. The component according to claim 15, comprising a cladding and/or a structural element of a fuel assembly for a nuclear reactor.

17. The component according to claim 15, comprising a multiplex structure comprising the zirconium alloy and at least one other material.

18. The component according to claim 17, comprising a duplex structure.

19. The component according to claim 17, comprising a triplex structure.

20. The component according to claim 18, which is in the form of a tube or a co-laminated sheet comprising a first layer or internal layer constituted by the zirconium alloy and a second layer or external layer placed on said first layer and constituted by another metal or alloy different from the alloy constituting said first layer.

21. The component according to claim 20, wherein said second layer is constituted by another zirconium alloy.

22. The component according to claim 21, wherein said zirconium alloy constituting the second layer has the same composition as the alloy constituting the first layer but with no erbium and with an oxygen content that is possibly different.

23. The component according to claim 21, wherein said alloy constituting the second alloy has optimum properties with respect to the external corrosion of the tube or of the sheet.

24. The component according to claim 19, which is in the form of a tube or a co-laminated sheet comprising a first layer or internal layer constituted by the zirconium alloy and a second or external layer placed on said first layer and constituted by another metal or alloy different from the alloy constituting said first layer, the component further comprising a third layer placed under said first layer, said third layer being constituted by another metal or alloy different from the alloy constituting the first layer.

25. The component according to claim 24, wherein said metal or alloy constituting the third layer is identical to the metal or alloy constituting the second layer.

26. A method for the preparation and possibly the conversion of a zirconium alloy that includes by weight:

more than 0.6% of niobium;

from 0.1 to 3.0% of erbium;

from 0.05 to 0.5% of oxygen;

from 50 ppm to 0.6% of iron;

up to 3.5% of tin;

manufacturing impurities; and the remainder zirconium, said method comprising
melting the zirconium alloy; and possibly:
a succession of heat treatment steps and hot and/or cold forming steps; and
a final heat treatment.

27. The method according to claim 26, wherein said final heat treatment is carried out at a temperature less than or equal to 600° C. and for a duration greater than 1 minute.

28. A method for the preparation and possibly the conversion of a zirconium alloy that includes by weight:

more than 0.6% of niobium;

from 0.1 to 3.0% of erbium;

from 0.05 to 0.5% of oxygen;

from 50 ppm to 0.6% of iron;

up to 3.5% of tin;

manufacturing impurities; and the remainder zirconium, said method comprising
melting the zirconium alloy; and possibly the following succession of steps:
a homogenization heat treatment;
hot trimming;
a recrystallization heat treatment;
cold rolling;
a recrystallization heat treatment; and
cold rolling.

29. The method according to claim 28, wherein the recrystallization heat treatments are carried out at a temperature less than or equal to 600° C. and for a duration greater than 1 minute.

30. The method according to claim 26, wherein said melting is carried out by melting a starting zirconium alloy, comprising all the constituent elements of the alloy except for the erbium and then adding the required quantity of erbium to the liquid phase obtained, meaning that the erbium dissolves in said starting alloy.

31. The method according to claim 30, wherein the required quantity of erbium is added in metallic form.

32. The method according to claim 30, wherein the required quantity of erbium is added in alloyed form.

33. The method according to claim 32, wherein the required quantity of erbium is added in the form of $Er_2O_3$.

34. The method according to claim 28, wherein said melting is carried out by melting a starting zirconium alloy, comprising all the constituent elements of the alloy except for the erbium and then adding the required quantity of erbium to the liquid phase obtained, meaning that the erbium dissolves in said starting alloy.

* * * * *